Nov. 6, 1928.

W. C. BRINTON 1,691,020

STEERING GEAR

Original Filed Dec. 17, 1921   5 Sheets-Sheet 1

Nov. 6, 1928.

W. C. BRINTON

1,691,020

STEERING GEAR

Original Filed Dec. 17, 1921   5 Sheets-Sheet 2

INVENTOR
Willard C. Brinton
BY
E. W. Marshall
ATTORNEY

Nov. 6, 1928.

W. C. BRINTON

1,691,020

STEERING GEAR

Original Filed Dec. 17, 1921   5 Sheets-Sheet 5

INVENTOR
Willard C Brinton
BY
E. W. Marshall
ATTORNEY

Patented Nov. 6, 1928.

1,691,020

UNITED STATES PATENT OFFICE.

WILLARD C. BRINTON, OF NEW YORK, N. Y., ASSIGNOR TO TERMINAL ENGINEERING COMPANY, INC., OF NEW YORK, N. Y., A CORPORATION OF NEW YORK.

STEERING GEAR.

Application filed December 17, 1921, Serial No. 522,987. Renewed April 2, 1928.

This invention relates to the steering gear for self propelled vehicles and has for one of its objects the provision of steering mechanism of improved efficiency and flexibility.

A feature of the invention resides in the fact that it is applicable to vehicles whose wheels are all arranged for steering; and when so applied manipulation of the steering wheel readily controls the angularity of the wheels, even when the vehicle is standing still. According to this feature the degrees of angularity are different for the several wheels, when the vehicle is turned, the axes of the wheels being coincident with lines meeting at a common point, around which the vehicle is turned.

Another object relates to the provision of compensating means for substantially equalizing and compensating for distortion of the frame of the vehicle caused by inequalities in the road surface. According to this feature bumps or ruts in the road, or uneven disposition of a heavy load upon the vehicle do not affect the steering.

Another feature relates to automatically compensating for variations in position of the "sprung" weight, whereby such changes in position due to the flexure of the springs of the vehicle will not affect steering, irrespective of the angular position of the wheels and associated steering mechanism.

Another feature relates to a segment pivoted on the longitudinal center of the vehicle and its connections with the wheels, whereby a single link connection to each wheel controls the angularity of the respective wheel in an unlike degree according to the direction of turning.

Another feature relates to a supporting bracket for this segment, whereby secure attachment to the vehicle axle is effected in a simple and efficient manner.

Still another object relates to a symmetrically positioned rack and pinion serving as the primary operating member, whereby the rotary motion of the steering wheel is converted to linear motion to effectively rotate the planes of the wheels.

Another feature relates to an arrangement for passing the steering linkage by the source of energy.

Other objects will appear as the description of the invention progresses.

Referring to the drawings.

Like reference characters denote like parts in the several figures of the drawing.

Figure 1:
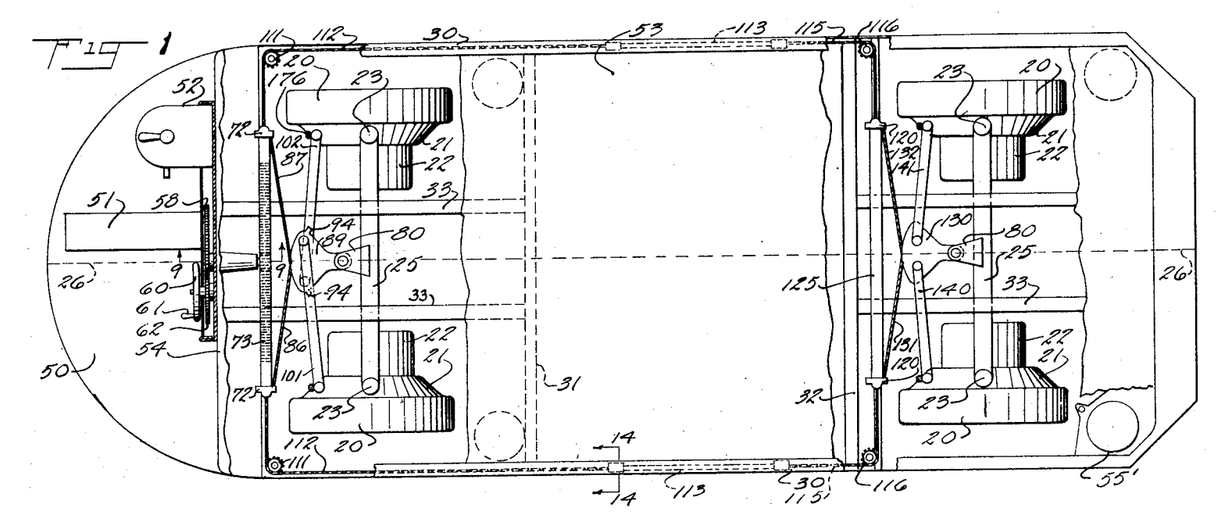
Figure 1 shows a plan view of the steering mechanism of a motor truck embodying my invention, parts of the truck structure being omitted for the sake of clearance.
Figure 2:
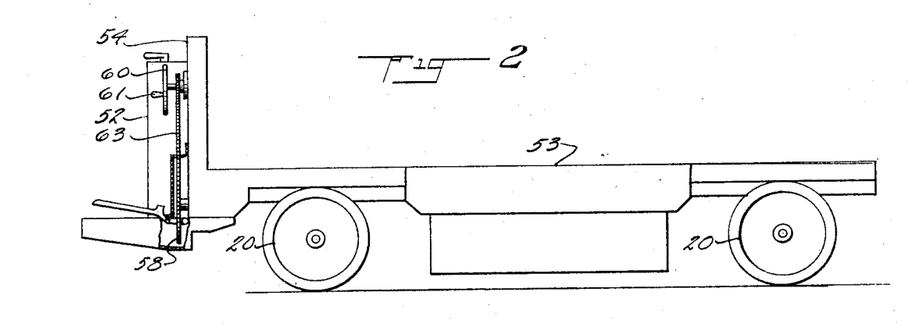
Figure 2 shows a side elevation thereof.

Referring to Figure 1, the wheels of the truck designated 20 are provided with suitable tires and mounted preferably in roller-bearings upon wheel supporting structures 21. Motors such as 22 are provided to drive the wheels through suitable gearing mechanism, (not shown). Supported in a trunnion bearing at the point 23, on either of said motor structures is one end of an axle, 25; there being, of course, one axle for each pair of wheels. It will be noted that while the wheels can revolve either clockwise or counterwise, relative to Figure 2, the load plane of each wheel is rotatable around the point 23 as shown in Figure 1.

By varying the angularity of the wheels the truck may be steered; in the present embodiment all of the wheels are used for steering as well as for driving. The load planes of the wheels are normally parallel to one another and to the longitudinal center of the truck represented by the line 26—26.

Figure 20:
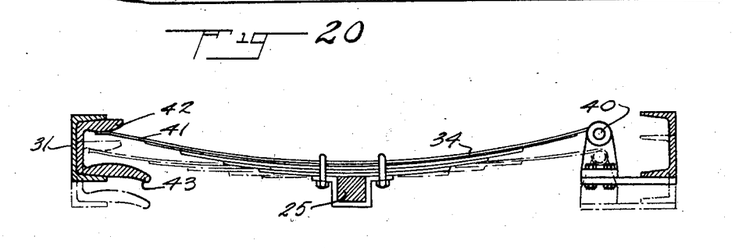

The frame of the truck comprises a pair of laterally arranged channels, 30, and transverse beams, such as 31—32. The longitudinal struts 33, 33, are provided to add strength and rigidity to the structure. Suitable springs preferably of semi-elliptic shape are secured to the axles 25, in a manner such as shown in Figure 20. and one of the ends of each of the springs is secured by means of a usual shackle-bolt, 40, to the cross members of the frame. The opposite end 41 slidably supports the rounded surface of a member 42 which has a lowerly extending curved lip 43 to guide the end 41 on the rebound. The member 42 is secured on the concave surface of the beams such as 31—32. Thus the frame and body are resiliently supported upon the axle and wheel structure.

A platform 50 is provided at one end of the truck, hereinafter known as the front end, upon which the operator stands during movement of the truck. The truck operates in either direction with equal facility. One foot of the operator depresses the brake pedal, 51, which is made suitably large for the sake of convenience. Depression of the brake pedal 51 releases the brake mechanism (not shown). The motors such as 22 are connected in a suitable manner through a controller box 52 to a source of energy such as a storage battery, beneath portion 53 of the platform of the truck. Manipulation of the controller 52 causes the motors to drive the truck in a desired direction.

A plurality of hoisting jacks 55′ may be provided in spaced relation for the purpose of lifting the load to be carried. Said jacks may be actuated by a driving mechanism (not shown) controlled from a suitable mechanism on the dash 54. A flooring may be provided removably supported on the frame.

Rotatably mounted on the dash 54 is a steering wheel 60 provided with a handle 61 and sprocket 62. Said wheel 60 is preferably mounted in a position convenient to the hands of the operator. The front extremities of channels 30, 30 are connected by a cross member 55, having a chamber for supporting a roller-bearing 56, in which is mounted a shaft 57 (see Figure 9). Said shaft 57 is parallel with the shaft of the wheel 60 but is positioned relatively near the level of the driving wheels. Keyed to the shaft 57 is a sprocket 58 which is operatively connected with the sprocket 62 by means of a suitable chain 63. The hub of the sprocket wheel 58 is provided with a groove 59 with which co-operates a finger 64, secured to the member 55 in any desired manner, as for example, by being bolted thereto. Secured to the shaft 57 is a pinion 65.

Figure 8:
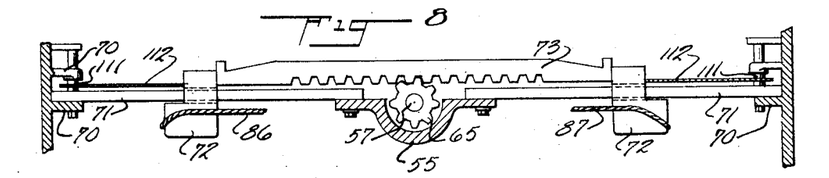
Figure 8 shows a section on the line 8—8 of Figure 9.

The frame is provided with a pair of inwardly extending ears, 70 on each side of the front portion thereof, adapted to support one of a pair of slide-bars 71, which extends to a centrally disposed portion of the member 55 (see Fig. 8). Each slide-bar 71 is preferably made of bronze or a similar alloy and is supported by one of the ears 70 and the member 55 in any well known manner. Slidably mounted on each of the bars 71 is a slide 72 shown in Figures 8, 10, 11, and 12, suitably secured to the extremity of the member 73. The member 73 is thus supported by the slides 72. The lower surface of the member 73 is provided with a plurality of teeth adapted to mesh with the pinion, 65.

Figure 3:
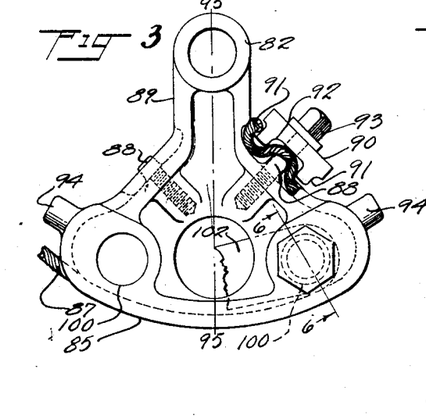
Figure 3 shows a plan view of the front segment forming part of the steering gear.
Figures 5, 7:
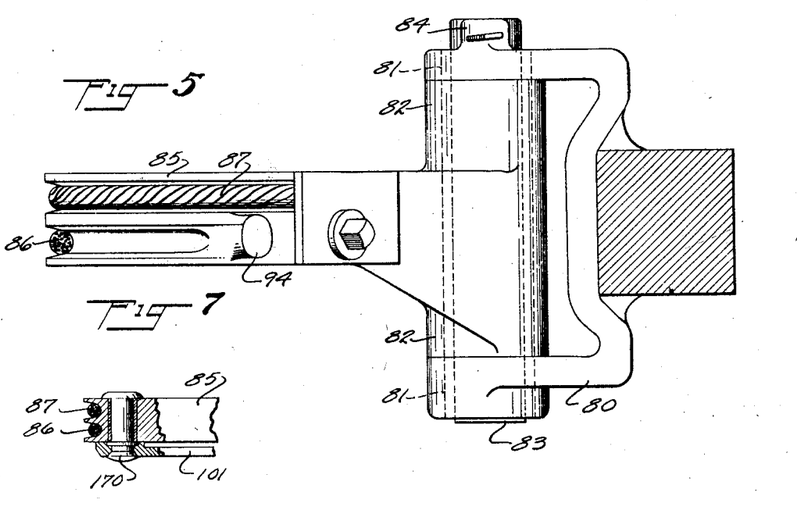
Figure 5 shows a side elevation of the segment of Figure 3 mounted on a bracket secured to the axle.
Figure 7 shows a modification of the pivot of Figure 6.

At substantially the middle point of each of the axles, 25, is secured in any suitable manner such as by welding, an M-shaped member 80 (see Fig. 5). The concave surface of the middle portion of each of said M-shaped members is in surface contact with a vertical face of the respective axle and thus the end portions thereof are in a horizontal plane. Each of these end portions is provided with an aperture 81; and between them is a hub 82 of the steering mechanism segment. A pin 83 extends thru the apertures and the hub and is provided with a pair of flat surfaces on its upper end portion as shown in Figure 5. These end portions engage the inner walls of a pair of flanges 84 shown in Figure 5. The segment 89 associated with the front axle differs somewhat from the segment 130 associated with the rear axle as will presently appear. The front segment is shown in plan view in Figure 3 and comprises the hub 82 and the web-portion 85 forming a segment of a circle having the center of the hub 82 as its center. The periphery of the web-portion 85 comprises a double sheave in the grooves of which the ropes 86—87 are adapted to be retained.

The segment end of each of the ropes is secured by means of a cable clamp having teeth 88 on the relatively stationary member and comprising a relatively movable member 90, having a plurality of teeth 91 forming a groove 92 between them. The depression of the groove 92 is greater than the height of the teeth 88 plus the diameter of the ropes or cable and thus the cable is not in contact with the bottom surface of the groove. The cap screws 93 are provided for securing the members together. The side of the segment on the far side of that shown in Figure 5 is symmetrical with the near side; the ropes 86 being secured by means of a similar clamp opposite its groove.

Figure 6:
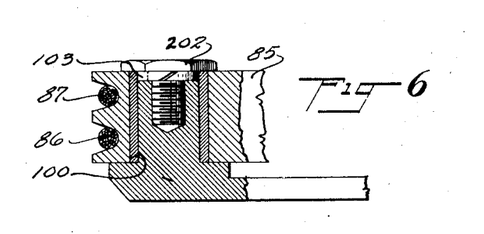
Figure 6 shows a section taken on the line 6—6 of Figure 3 and shows the pivotal connection of a steering link.

A boss 94 extends outwardly from the sides of the web-portion 85 so as to contact with a vertical face of the front axle 25. This prevents incorrect adjustments of the apparatus from moving the wheels too far. The segment is mounted on the bracket 80 in a manner shown in Figure 1 so that in its normal position its center 95 will coincide with the longitudinal axis 26, 26 of the vehicle. A pair of apertures 100, 100 are provided through the web-portion 85 of the segment at points laterally displaced from said center line 95—95. Said apertures are suitably bushed for engagement with connecting links 101, 102. In the embodiment shown in Figure 6 a cap screw 202 and washer 103 serve to secure each of said connecting links to the segment in such a manner that the connecting links may rotate with respect to the segment. In the modification shown in Figure 7 a rivet 170 extends through the body of the link 101 and into the segment 85, the head of the rivet being peened over to retain the link in position. The connecting link 101 extends over the upper surface of the segment and the connecting link 102 extends beneath the lower surface thereof for a purpose which will be subsequently set forth. The opposite outer ends of said connecting links 101, 102 are pivotally secured to the respective wheel members 21, as shown in Figure 21.

Figures 13, 14, 17, 18, 21, 22:
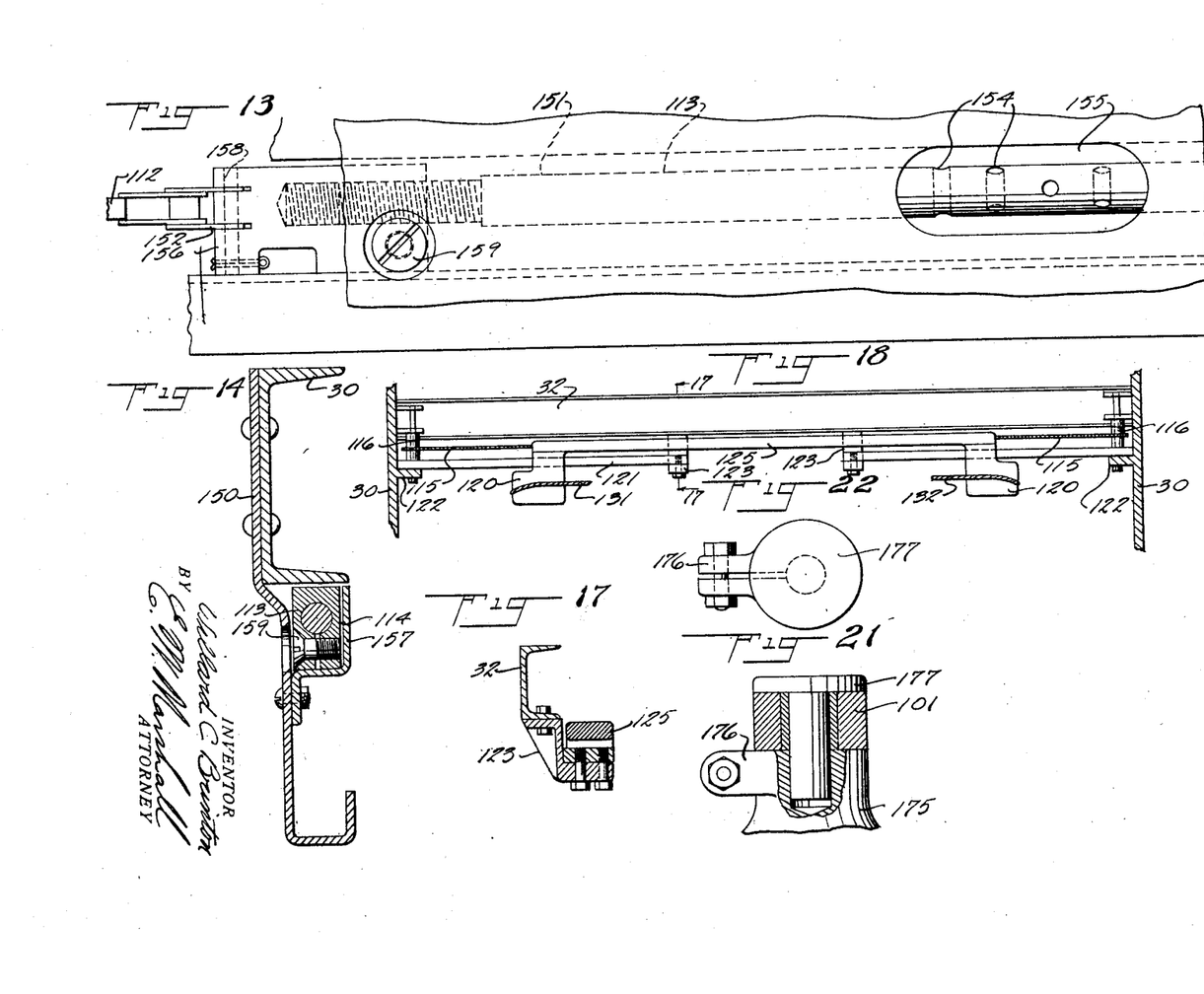
Figure 13 shows the turnbuckle connecting the front and rear elements of the steering mechanism.
Figure 14 is a section taken on line 14—14 of Figure 1.
Figure 17 shows the supporting brackets for the rear slide bars.
Figure 18 shows the rear slide bars in place.
Figures 21 and 22 show respectively end and top views of the motor support for a connecting link.

Referring to Figures 21 and 22, each wheel housing 21 is provided with a shoulder 175 which terminates in a split neck 176. Extending through a bushed hole in the outer end portion of the link 101 and into the neck 176 is a stud 177. A suitable bolt tightens the neck 176 on the body portion of the stud 177, thus securing it in position. The link 101 may rotate freely on the stud and when moved by action of the steering gear, moves the housing 21 and changes the angular position of the wheel.

Figures 9, 10, 11:
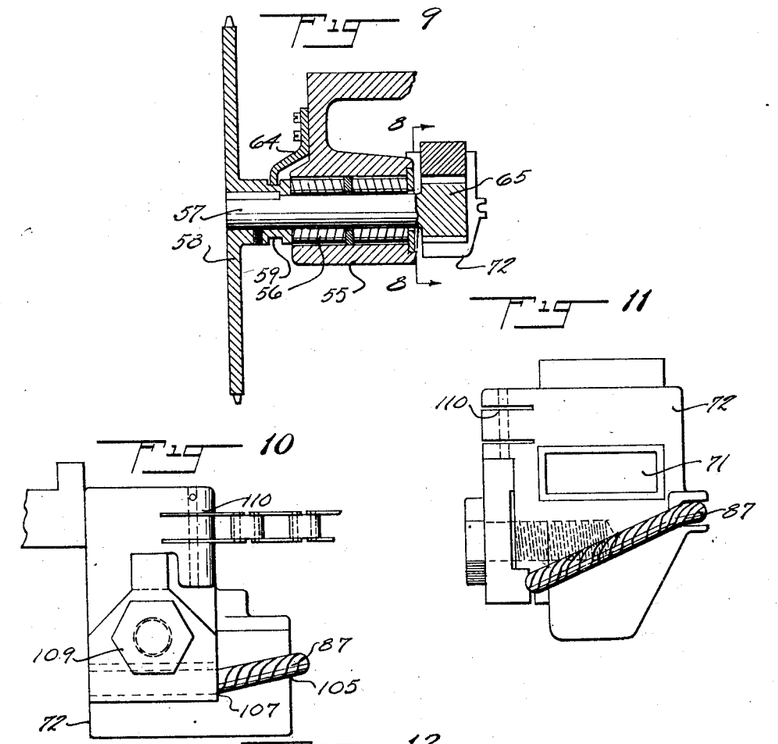
Figure 9 shows a section taken on the line 9—9 of Figure 1.
Figure 10 is an enlarged view of the slide member of Figure 8.
Figure 11 and Figure 12 are side and plan views of Figure 10 respectively.
Figure 12:
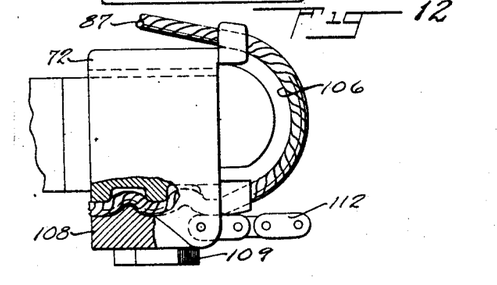

One end of each of the ropes 86, 87 is fastened to a slide 72 by means of a cable clamp as shown in Figures 10, 11, and 12. The rope or cable connects with a slide at the point 105 (Fig. 10) and bends around the curved end 106 to a point 107 somewhat below the point 105. A clamping member 108 having teeth of the shape shown in Figure 13 co-operate with grooves in the slide 71 by means of a cap screw 109.

It will be seen that rotation of the steering wheel 61 by the operator in say a clockwise direction, facing forward, will rotate the pinion 65 in the same direction. Referring to Figure 8, this will move the member 73 to the right hand side of the vehicle, facing forward. The segment 89 is rotated in a clockwise direction looking at Figure 1 and the connecting link 101 will therefore change the angularity of the plane of the left hand wheel 20, with respect to the longitudinal center line 26—26; similarly the connecting link 102 will change the angularity of the plane of the right hand wheel 20 with respect to said axis, as shown clearly in Figures 15 and 16.

Thus the displacement of the connecting link 102 from its position shown in Fig. 1 will be greater than that of link 101 and the angular displacement of the associated right hand wheel will be greater than that of the left hand wheel. Thus the planes of the wheels will be substantially tangent to the circles shown in light lines in Figure 15 and slipping of the wheels on the pavement while running is thus effectively prevented. In the normal position of the steering gear the wheels are parallel to one another but as the steering gear is turned the two wheels of the pair are turned in a different degree. The wheel facing the line of direction, when the turn is made, turns a greater extent than the other wheel of the pair and it will be seen that lines drawn perpendicular to the plane of the wheels at their centers will meet at substantially a common point, this point being determined by the extent of movement of the steering wheel 60.

Each of the slides 72 is provided with a pair of lateral slots 110, through which extends a suitable pin, adapted to fasten one link of a usual sprocket chain such as 112. Supported upon the ears 70 is a sprocket wheel 111 around which the chain 112 may move. Said chain is attached at its other end to an end of a turnbuckle 113 which extends in a cage 114, adjacent to the sides of portion 53 (see Fig. 13). It will be seen that the cage 114 is in a vertical plane with the channel 30 and thereby a maximum space is provided for the location of the storage battery. The turnbuckles 113 interconnect the front and rear elements of the steering gear. A plate member 150 imparts strength and rigidity to the middle portion of the channel 30. The cage 114 is formed by the lower face of the channel 30, a portion of the surface of the plate 150, and by two faces of a second plate 157 bent alternately in two planes perpendicular to each other. A pair of nuts 156 of a shape corresponding to the race so formed, slide therethrough. Each nut is provided at its outer end with a pin 158 and suitable slots for engaging the end link 152 of the chain 112, 115 the pin being held by a suitable cotter pin. The inner end of each nut is drilled for a portion of the length of the nut and the hole of one nut of a pair is screw threaded in a right hand direction and that of the other in the opposite direction. A rod 151 has its end portions screw threaded to correspond to the tapped holes and has its middle portion pierced by spaced radial holes 154 in directions at angles to one another. The rod 151 is inserted into the tapped holes of the nuts 156 to a desired depth. Rotation of the rod 151 may be readily effected by inserting a rod (not shown) into the angular holes 154, access being had thereto through a slot 155 in the member 150. During such rotation the nuts 156 are held against rotation by the sides of the race, and are caused to separate from or approach one another by the action of the right and left hand threaded ends of the rod 151. In this manner the chains 112, 115, may be adjusted and the action of the rear steering elements may be varied independently of the front elements. When a desired adjustment is obtained, the screw 159 is turned down, thus tightening the nut upon the rod 151. The nut 156 is split to give its parts a slight resiliency. Attached to the other end of the turnbuckle is another chain 115 which passes around a sprocket 116 and is attached to the rear slide 120.

Two rear slides are provided, each slidably supported upon a slide bar 121 (see Fig. 18). Each of these bars is supported at its outward end upon inwardly extending ears 122 on the channel 30; and at its inner end to a bracket 123 which in turn is fastened to the transverse beam 32 by means of a castellated nut as clearly shown in Figure 17. The slides are interconnected by a member 125 suitably fastened to the slides, as for example, by machine screws.

Figure 4:
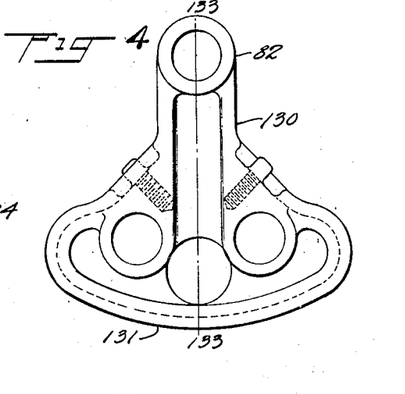
Figure 4 shows a similar view of the rear segment.

Attached to the rear axle is an M-shaped bracket 80 adapted to support the rear segment 130. Said segment is provided with a web-shaped portion 131 having a pair of grooves in its periphery, similar to those of the front segment 89. The rear slides 120 and the rear segment 130 are provided with cable clamps similar to those of the corresponding front members and ropes or cables 131, 132 connect said slides with said segment. The holes for supporting the link cap screws are closer together on the rear segment 130 than on the front segment, as will be clear from comparison of Figures 3 and 4.

Figure 15:
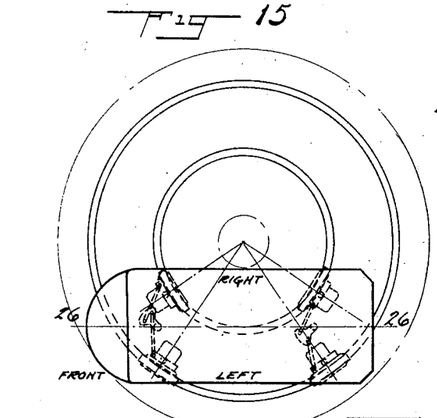
Figure 15 and Figure 16 show diagrammatically the steering mechanism of the truck when in the extreme positions.
Figure 16:
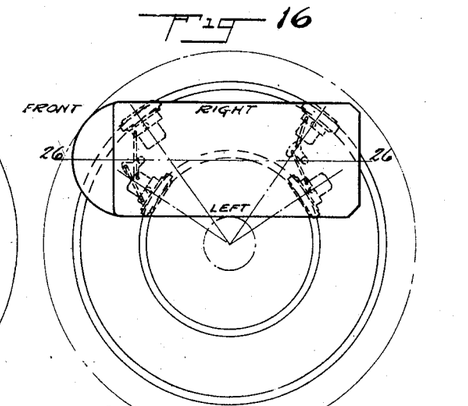
Figure 19:
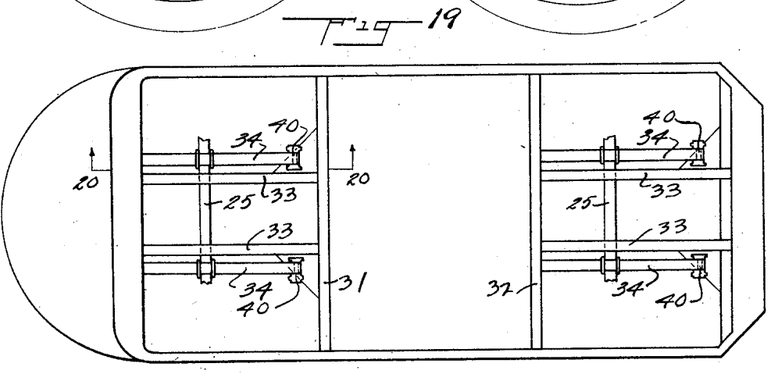
Figures 19 and 20 show the springs of the vehicle.

A connecting link 140 operatively connects the rear segment 130 with the left hand rear wheel and a similar connecting link connects the segment 130 with the right hand rear wheel. It will be noted that these connecting links do not cross over to the opposite sides with respect to the wheels. Thus when the rack 73 is moved toward the right of the truck, the rear slides 120 are moved to the left and the rear segment 130 is moved in a counterclockwise direction. The connecting links 140, 141 are pivotally secured to the segment 130 at points spaced apart from the center line 133—133 coinciding normally with the axis 26—26 of the truck. As shown in Figures 15 and 16 these points are movable around arcs such that when the segment 130 moves in a counterclockwise direction the connecting link 140 is moved to a less degree than connecting link 141. The load plane of the rear wheels is rotated in a direction opposite to that taken by the front wheels, the relative movement of the two rear wheels being such as to cause the rear wheels to be tangential to the arcs of the circles upon which they move. Thus practically no slipping takes place.

Restoration of the steering wheel 60 restores the rack 73 and the slides 120, 120 and the segments 89, 130 to normal, thus bringing the load planes of the wheels back to parallelism with the truck.

To steer in a left hand direction steering wheel 60 is rotated in the opposite direction, the wheels taking a position similar to that shown in Figure 16.

It will be seen that variations in the spring flexure as shown in Figure 20, do not materially affect steering, since the cables 86, 87, 131, 132 are positioned to permit such flexure without effect thereon.

The present embodiment is one form in which the invention may be practiced but it is understood that the scope of the invention is not to be determined thereby, reference being had to the appended claims for the purpose.

What I claim is:

1. In a vehicle steering gear, a pair of wheels having their planes normally substantially parallel, an arc shaped member comprising a segment of a sheave having a pair of grooves therein, a pair of ropes secured to said member and adapted to bear in the grooves of the sheave and to cause rotation of the member, and links operatively connecting said member with each of the wheels, each link being secured to the member at points on radii at angles on opposite sides of the axis of said member whereby movement of said rope causes unlike adjustments of the planes of said wheels.

2. In a vehicle steering gear, a pair of wheels, means for turning said wheels comprising a segment shaped member intermediate the wheels, links operatively connecting each of said wheels with said member, each of said links being pivoted on the member at a point on the opposite side thereof with respect to the corresponding wheel, a second pair of wheels, means for turning the wheels of the second pair comprising a second segment shaped member intermediate the wheels of the second pair, links operatively connecting each of the wheels of the second pair with the second named member, each of said links being pivoted on the member at a point on the side corresponding to the respective wheel and flexible linkage operatively connecting said segments.

3. In a vehicle steering gear, a pair of wheels, means for turning said wheels comprising a segment shaped member intermediate the wheels, links operatively connecting each of said wheels with said member, each of said links being pivoted on the member at a point on the opposite side thereof with respect to the corresponding wheel, a second pair of wheels, means for turning the wheels of the second pair comprising a second segment shaped member intermediate the wheels of the second pair, links operatively connecting each of the wheels of the second pair with the second named member, each of said links being pivoted on the member at a point on the side corresponding to the respective wheel, a bar slidable in a transverse plane, a pair of ropes interconnecting said bar and the first named member, a pair of slides, a rope interconnecting each of the slides with the second named member, linkage interconnecting the bar and the slides, and means for reciprocating the bar.

4. In a vehicle steering gear, a pair of wheels having their planes normally substantially parallel, and means for turning said planes out of parallelism comprising housings rotatable with each wheel, each housing rotating around a pivotal point, said pivotal points being positioned on a line connecting substantially the centers of the wheels when in normal position, a member pivotally mounted between the wheels and substantially on said line, and links connecting the member and the wheel housings, each link being of different length than the distance between the pivotal mounting and the pivotal point corresponding to its respective wheel, a second pair of wheels having their planes normally substantially parallel and means for turning said planes out of parallelism comprising housings rotatable with each wheel, each housing rotating around a pivotal point, said second named pivotal points being positioned on a line connecting substantially the centers of the wheels of the second named pair when in normal position, a second member pivotally mounted between the wheels of the second pair and substantially on said second named line, links connecting the second named member and the wheel housings of the second pair of wheels, each link being less in length than the distance between the pivotal mounting and the pivotal point corresponding to its respective wheel, a bar slidable in a transverse plane, a pair of ropes inter-connecting said bar and the first named member, ropes inter-connecting each of the slides with the second named member, linkage interconnecting the bar and the slides, and means for reciprocating the bar whereby said members and said wheels are actuated for steering.

5. In a vehicle, a transverse axle, a wheel pivotally mounted at or near each extremity of the axle and having its plane rotatable upon the pivot, a member pivotally mounted on said axle at a point substantially midway said wheels, links operatively connecting said member with each of said wheels, a frame resiliently mounted upon said axle, a rack slidably mounted on the frame and means comprising a pinion engaging said rack for oscillating said rack, a rope connecting each end of said rack with said member arranged to actuate the member and adjust the angularity of said wheels independent of the position of the frame with respect to the axle.

6. In a vehicle having an axle, the combination of steering mechanism mounted centrally upon the axle, springs secured to said axle, a frame mounted on the free portions of said springs, steering control means mounted on said frame, and means including flexible cables connecting said control means and said steering mechanism whereby distortion of said springs is inactive upon said parts.

7. In a vehicle, steering gear comprising a steering wheel, a pinion operatively connected therewith, a rack adapted to be moved linearly in a line transverse to said vehicle, a pair of wheels for said vehicle, a rotatable member intermediate said wheels and operatively linked thereto for varying the angularity of the planes of said wheels relative to the vehicle, and flexible cables operatively interconnecting the ends of said rack and said member.

8. In a vehicle, steering gear comprising a steering wheel, a pinion operatively connected therewith, a rack adapted to be moved linearly transverse to said vehicle, a pair of wheels for said vehicle, a rotatable member intermediate said wheels and operatively linked thereto for varying the angularity of the planes of said wheels relative to the vehicle and a rope connecting each end of said rack and said member.

9. In a vehicle, steering gear comprising a steering wheel, a pinion operatively connected therewith, a rack adapted to be moved linearly transverse to said vehicle, a pair of wheels for said vehicle, a rotatable member intermediate said wheels and operatively linked thereto for varying the angularity of the planes of said wheels relative to the vehicle, a flexible cable connecting each end of said rack and said member and fastening means for securing the extremities of said cable comprising a plurality of indented members and means for securing each of said members in intimate contact with said cable.

10. In a vehicle, steering gear comprising spaced steering members, a race of angular cross section intermediate said members, linkage operatively connecting said members comprising a pair of split nuts at the ends of the race and corresponding in section with that of the race, each nut having a threaded hole on the inwardly disposed surface, a rod having its end portions threaded to enter said holes and having a plurality of radial perforations in its intermediate portion and flexible means connecting each nut with its respective steering member.

11. In a vehicle, steering gear comprising spaced steering members, a race of angular cross section intermediate said members, linkage operatively connecting said members comprising a pair of split nuts at the ends of the race and corresponding in section with that of the race, each nut having a threaded hole on the inwardly disposed surface, a rod having its end portions threaded to enter said holes and having a plurality of radial perforations in its intermediate portion, means for securing said rod to said nuts, said race having apertures to give access to said perforations and said means, and flexible means connecting each nut with its respective steering member.

12. In a vehicle, a frame, two pairs of wheels, steering gear for steering said wheels comprising a bar movable transversely of the frame, a slidable support for said bar, manually operable means for reciprocating said bar, means operatively connecting said bar with one pair of said wheels, a pair of slides, means operatively connecting said slides with the second pair of wheels, and flexible cable means inter-connecting said slides with said bar for reciprocating said slides when said bar is reciprocated.

13. In a vehicle, two pairs of wheels having their load planes rotatable with respect to the vehicle, steering gear for varying the angularity of said planes comprising a bar, a slidable support for said bar, manually operable means for reciprocating said bar, means normally symmetrical with the longitudinal center line of the vehicle arranged to operatively connect said bar with one pair of said wheels, a pair of slides, means normally symmetrical with the longitudinal center line of the vehicle arranged to operatively connect said slides with the second pair of wheels, and means including flexible cables interconnecting said slides with said bar for reciprocating said slides when the bar is reciprocated.

14. In a vehicle, two pairs of wheels, steering gear for steering said wheels comprising a toothed bar, a slidable support for said bar, a rotatable steering wheel, a pinion operated by said steering wheel meshing with the teeth of said bar, means operatively connecting said bar with one pair of said wheels, a pair of slides, means operatively connecting said slides with the second pair of wheels, and means interconnecting said slides with said bar for imparting movement to said slides in a reverse direction, when said bar is moved by said steering wheel.

15. In a vehicle steering gear, two pairs of wheels, a bar, a slidable support for said bar, manually operable means for reciprocating said bar, an axle for each pair of wheels, a partially rotatable member pivoted to each of said axles on a substantially longitudinal center line of the vehicle, means operatively connecting said bar with one of said members, a pair of slides, means interconnecting said slides with said bar constructed to reciprocate said slides in the reverse direction when said bar is reciprocated, means operatively connecting said slides with the other of said members and connecting links connecting said members with the wheels for rotating the planes of the wheels when said manually operable means are actuated.

16. In a vehicle steering gear, two pairs of wheels, a toothed bar, a slidable support for said bar, a rotatable steering wheel, a pinion operated by said steering wheel and meshing with the teeth of said bar, an axle for each pair of wheels, a partially rotatable member pivoted to each of said axles on substantially the longitudinal center line of the vehicle, means operatively connecting said bar with one of said members, a pair of slides, means interconnecting said slides with said bar constructed to impart movement to said slides in a direction reverse to that of the bar, means operatively connecting said slides with the other of said members, and connecting links connecting said members with the wheels for rotating the planes of the wheels when said steering wheel is rotated.

17. In a vehicle steering gear, a pair of wheels having their planes normally substantially parallel, an arc shaped member comprising a segment of a sheave, a rope secured to said member and adapted to bear in the groove of the sheave and to cause rotation of the member, links operatively connecting said member with each of the wheels, each link being secured to the member at points on radii at angles on opposite sides of the axis of said member whereby movement of said rope causes unadjustments of the planes of said wheels, and slidable means for actuating the ropes in a direction substantially the same as the direction of movement of the slidable means.

18. In a vehicle steering gear, a pair of wheels having their planes normally substantially parallel, and means for varying the angularity of the wheels comprising a pivoted member, connecting links connecting the member with the wheels, slidable means movable transversely on said vehicle, and flexible means interconnecting the slidable means and the means disposed substantially transversely of the vehicle.

19. In a vehicle, a frame, a pair of front wheels and a pair of rear wheels, steering mechanism for each pair of wheels including a member pivoted on a fixed pivot intermediate each pair of wheels, links pivoted on said members and connecting said members to said wheels, a pair of flexible members connected to each of said pivoted members and extending in opposite directions therefrom and means including flexible cables connecting the steering mechanism of the two pairs of wheels.

20. In a vehicle, a frame, a pair of front wheels and a pair of rear wheels, steering mechanism for each pair of wheels including a member pivoted on a fixed pivot intermediate each pair of wheels, links pivoted on said members and connecting said members to said wheels, a pair of flexible members connected to each of said pivoted members and extending in opposite directions therefrom and means including flexible cables extending along the side of the vehicle frame and connecting the steering mechanisms of the two pairs of wheels.

21. In a vehicle, a frame, a pair of front wheels and a pair of rear wheels, steering mechanism for each pair of wheels including a member pivoted on a fixed pivot intermediate each pair of wheels, links connecting said members to said wheels, a pair of flexible members connected to each of said pivoted members and extending in opposite directions therefrom and normally crossing each other at a point on the longitudinal center line of the frame and flexible means connecting the steering mechanisms of the two pairs of wheels.

22. In a vehicle, a frame, a pair of front wheels and a pair of rear wheels, steering mechanism for each pair of wheels including a member pivoted on a fixed pivot intermediate each pair of wheels, links connecting said members to said wheels, a pair of flexible members connected to each of said pivoted members and extending in opposite directions therefrom, flexible means connecting the steering mechanisms of the two pairs of wheels, and adjustable means for changing the length of said flexible connecting means.

23. In a vehicle, a frame, a pair of front wheels and a pair of rear wheels, an axle for each pair of wheels, a segment pivotally connected to each axle at substantially the longitudinal center thereof, a pair of links pivoted to each segment and connected to the wheels carried by the axle to which said segment is pivotally connected, a pair of flexible cables connected to each segment at a point offset from the center line of the segment, the cables of each pair normally crossing each other in a plane passing through the center line of the segment, a sliding bar for each pair of cables having its ends secured to said cable, flexible means secured to and connecting said bars, and means for longitudinally shifting one of said bars.

24. In a vehicle, a frame, a pair of front wheels and a pair of rear wheels, an axle for each pair of wheels, a segment pivotally connected to each axle at substantially and longitudinal center thereof, a pair of links pivoted to each segment and connected to the wheels carried by the axle to which said segment is pivotally connected, a pair of flexible cables connected to each segment at a point offset from the center line of the segment, the cables of each pair crossing each other in a plane passing through the center line of the segment, a sliding bar for each pair of cables having its ends secured to said cables, flexible means secured to and connecting said bars, and means disposed in alinement with the longitudinal center line of the frame for longitudinally shifting one of said bars.

25. In a vehicle, a frame, a pair of front wheels and a pair of rear wheels, an axle for each pair of wheels, a segment pivotally connected to each axle at substantially the longitudinal center thereof, a pair of links pivoted to each segment and connected to the wheels carried by the axle to which said segment is pivotally connected, a pair of flexible cables connected to each segment at a point offset from the center line of the segment, the cables of each pair crossing each other in a plane passing through the center line of the segment, a sliding bar for each pair of cables having its ends secured to said cables, flexible means secured to and connecting said bars, said flexible means extending along the side edges of the vehicle frame, and means for longitudinally shifting one of said bars.

26. In a vehicle, a frame, a pair of front wheels and a pair of rear wheels, an axle for each pair of wheels, a segment pivotally connected to each axle at substantially the longitudinal center thereof, a pair of links pivoted to each segment and connected to the wheels carried by the axle to which said segment is pivotally connected, a pair of flexible cables connected to each segment at a point offset from the center line of the segment, the cables of each pair crossing each other in a plane passing through the center line of the segment, a sliding bar for each pair of cables having its ends secured to said cables, flexible means secured to and connecting said bars, means for longitudinally shifting one of said bars, and means for varying the length of said flexible means.

27. In a vehicle, a frame, a pair of front wheels and a pair of rear wheels, a pair of segments, each segment being mounted on a fixed pivot disposed midway between each of said pairs of wheels, links connecting each segment to the wheels intermediate which said segment is mounted, said links being connected to the segment at points spaced from a center line passing through the pivots of the segments, the links connected to one of said segments crossing each other substantially on said center line when the wheels are disposed in parallel relation and flexible operating means for said segments.

28. In a vehicle, a frame, an axle, a pair of wheels pivotally mounted on substantially vertical pivots carried by said axle, a segment mounted on a fixed pivot disposed midway between said pair of wheels, links connecting said segment to said wheels, a bar slidable transversely of said frame, means for sliding said bar and flexible means connecting the ends of said bar with said segment, said means including a pair of cables crossing each other on a line coinciding with the longitudinal center line of the frame and passing through the pivot of said segment when the wheels are disposed in substantially parallel relation.

29. In a vehicle, a frame comprising a pair of longitudinally extending frame members, a pair of front wheels, a pair of rear wheels, a frame member carried by and extending below each of said frame members and having a guideway therein, means for steering each pair of said wheels and connecting means between the steering means for one pair of wheels and the steering means for the other pair of wheels, said connecting means extending through the guideways in said frame members.

30. In a vehicle, a frame comprising a pair of longitudinally extending frame members, a pair of front wheels, a pair of rear wheels, a frame member carried by and extending below each of said frame members and having a guideway therein, means for steering each pair of said wheels, flexible connecting means between the steering means for one pair of wheels and the steering means for the other pair of wheels, said connecting means extending through the guideways in said second frame members, and means disposed in said guideways for adjusting the length of said connecting means.

31. In a vehicle, a frame comprising a pair of longitudinally extending frame members, a pair of front wheels, a pair of rear wheels, a supplemental frame member secured to and extending below each of said frame members and having a channel therein, means for steering each pair of said wheels, flexible connecting means between the steering means for one pair of wheels and the steering means for the other pair of wheels, said connecting means extending through the channels in said supplemental frame members, and means disposed in said channels for adjusting the length of said connecting means.

32. In a vehicle, a frame, two pairs of wheels, a steering gear for steering said wheels including a bar slidable transversely of the frame, a support for said bar, operable means for reciprocating said bar, means operatively connecting said bar with one pair of said wheels, slidable means operatively connected to the second pair of said wheels and flexible cable means connecting said bar and slidable means for reciprocating said slidable means when the bar is reciprocated.

33. In a vehicle, a frame, two pairs of wheels connected thereto, each wheel being mounted on a substantially vertical pivot, steering mechanism for each pair of wheels including slidable means operatively connected to said wheels, means including flexible cables connecting the slidable means for one pair of wheels with the slidable means for the other pair of wheels and manually operable means for reciprocating the slidable means for one pair of wheels.

34. In a vehicle, a frame, two pairs of wheels connected thereto, each wheel being mounted on a substantially vertical pivot, steering mechanism for each pair of wheels including slidable means operatively connected to said wheels, means including flexible cables extending longitudinally along the side edges of the vehicle frame connecting the slidable means for one pair of wheels with the slidable means for the other pair of wheels and manually operable means for reciprocating the slidable means for one pair of wheels.

35. In steering mechanism for vehicles, a pair of wheels, a segment mounted substantially midway between said wheels, said segment having openings therethrough offset from the center line thereof and links connecting said segment with said wheels, each of said links having a stud adapted to be received in the opening in the segment, said opening having a bushing surrounding the stud and a cap screw engaging said stud and seating against said bushing for securing the stud to the segment.

36. In a vehicle, a pair of front wheels and a pair of rear wheels, steering mechanism for each of said pairs of wheels, including a segment positioned between each pair of wheels and links connecting said segments with said wheels, means for operating one of said segments including a bar slidable transversely of the vehicle, a second bar connected to the other segment and connecting means between said bars, said connecting means comprising brackets secured to the bars, said brackets having slots therein for receiving chain links and chains connecting the brackets on the front bar with the brackets on the rear bar, the end links of said chains being receivable by the slots on the brackets and means for securing said links in said slots.

37. A vehicle having a frame, a pair of wheels supporting said frame having their planes normally substantially parallel and in spaced relation with the longitudinal center line thereof, a member pivotally mounted upon the vehicle axle, substantially midway between the wheels, link rods interconnecting said wheels and said members, a pair of cables connected to each member, said members having depressions receiving said cables, a clamp for securing said cables to said members and means including flexible members for connecting the cables associated with one pair of wheels to the cables associated with the other pair of wheels.

38. In a vehicle, a frame, a pair of front wheels and a pair of rear wheels, steering mechanism for each pair of wheels including a member pivoted on a fixed pivot intermediate each pair of wheels, links connecting said members to said wheels, a pair of flexible members connected to each of said pivoted members and extending in opposite directions therefrom, and clamps for securing said flexible members to said pivoted members.

39. In a vehicle, steering gear comprising a steering wheel, a pinion operatively connected therewith, a rack adapted to be moved linearly transverse to said vehicle, a pair of wheels for said vehicle, a rotatable member intermediate said wheels and operatively linked thereto for varying the angularity of the planes of said wheels relative to the vehicle, a rope connecting each end of said rack and said member, and means for adjustably securing said rope to said racks.

In witness whereof, I have hereunto set my hand this 13th day of December, 1921.

WILLARD C. BRINTON.